United States Patent [19]

Bray

[11] 4,076,325
[45] Feb. 28, 1978

[54] PNEUMATIC BRAKING SYSTEM FOR TRACTOR-TRAILER COMBINATIONS

[75] Inventor: Robert John Bray, Huntington Woods, Mich.

[73] Assignee: Proven Environmental Products, Inc., Aurburn Heights, Mich.

[21] Appl. No.: 667,730

[22] Filed: Mar. 17, 1976

[51] Int. Cl.² .............................................. B60T 13/00
[52] U.S. Cl. ........................................ 303/7; 303/9; 303/29; 303/40; 303/69
[58] Field of Search ............... 303/7, 9, 13, 28, 29, 303/30, 40, 6, 37, 71, 68–69, 52, 80; 188/3, 112; 137/627.5

[56] References Cited

U.S. PATENT DOCUMENTS

| | | | |
|---|---|---|---|
| 3,001,831 | 9/1961 | Stelzer | 303/7 |
| 3,240,538 | 3/1966 | Valentine | 303/29 |
| 3,285,672 | 11/1966 | Avrea | 303/9 |
| 3,507,542 | 4/1970 | Cannella | 303/7 |
| 3,765,729 | 10/1973 | Toomey | 303/13 X |
| 3,857,614 | 12/1974 | Kurichh | 303/40 X |

*Primary Examiner*—Trygve M. Blix
*Assistant Examiner*—Douglas C. Butler
*Attorney, Agent, or Firm*—Harness, Dickey & Pierce

[57] ABSTRACT

A pneumatic braking system for tractor-trailer combinations in which the actuation and release of the trailer brakes occur more nearly in coincidence with the actuation and release of the tractor brakes; the system includes a fast acting amplifying valve operable in response to a control pressure indicative of the magnitude of braking desired to provide an amplified control pressure and a separate air supply located proximate to the amplifying valve for providing the air supply for the amplified control pressure.

33 Claims, 5 Drawing Figures

Fig-1 PRIOR ART SYSTEM

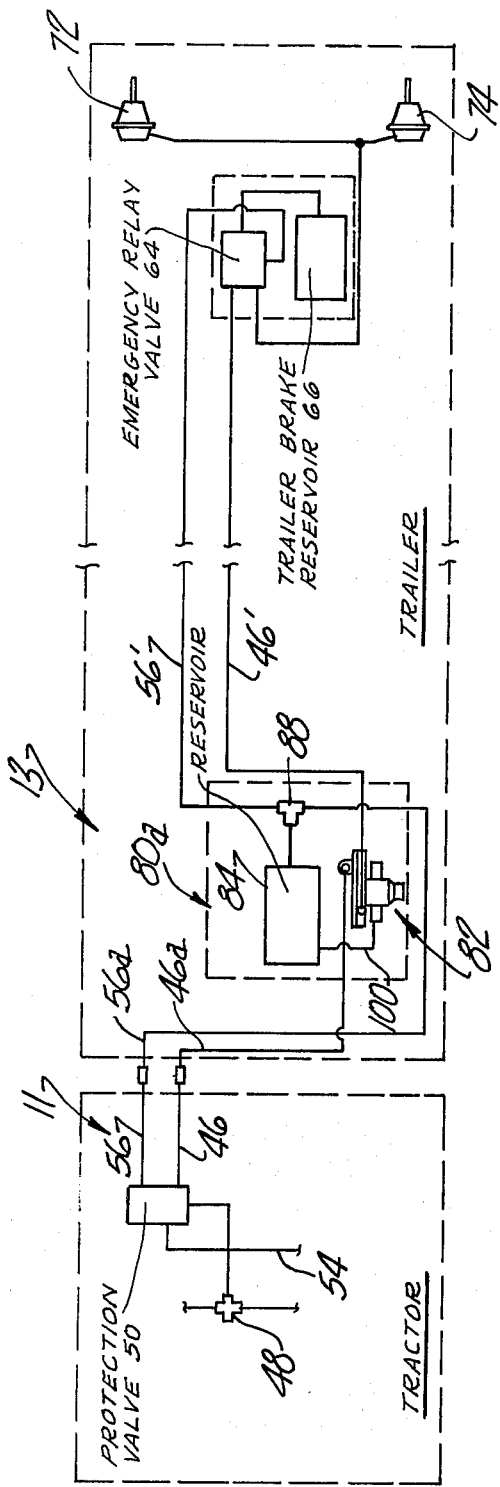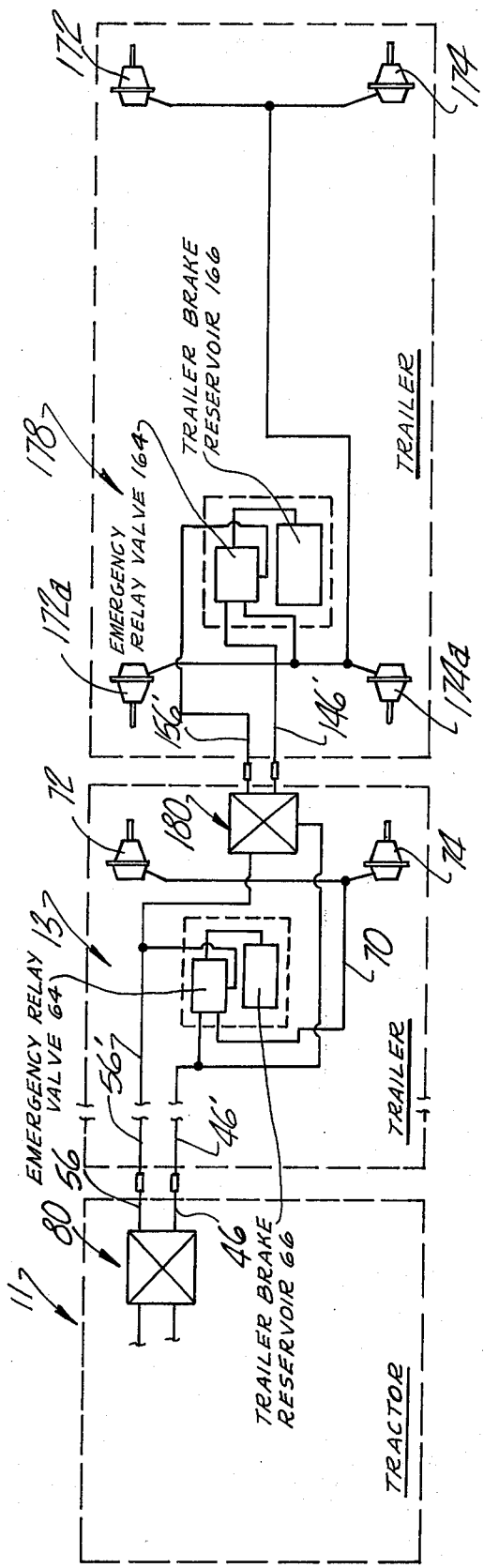

PNEUMATIC BRAKING SYSTEM FOR TRACTOR-TRAILER COMBINATIONS

SUMMARY BACKGROUND OF THE INVENTION

The present invention relates to pneumatic braking systems for tractor-trailer combinations and more particularly to a system including improved control pressure apparatus for providing braking of the trailer to be more nearly in coincidence with that of the tractor and in a preferred form to be slightly in advance of tractor braking.

In conventional tractor-trailer brake systems it is known to control the operation of the trailer brake actuators in response to the magnitude of pressure in a service line at the tractor; the service line transmits pressure to the tractor brake actuators with the magnitude being varied by a manually operated foot or treadle valve located on the tractor. The pressure in the service line is used as a pressure signal for actuation of an emergency relay valve; in some applications the emergency function from the valve is eliminated and the valve performs only a relay function. The latter valve operates in conjunction with an air supply on the trailer to provide pressure from the trailer air supply to the trailer brake actuators in response to the pressure signal and having a magnitude varying in accordance with the magnitude of the signal. However, there is a significant time lag from the time at which the pressure in the service line reaches and actuates the tractor brake actuators and the time at which the pressure signal reaches and actuates the emergency relay valve to actuate the trailer brake actuators. In addition to the time delay there normally is a significant reduction in pressure between the tractor and the emergency relay valve at the trailer. Thus the tractor brakes often engage substantially ahead of the trailer brakes and may result in trailer overrun or "jackknifing."

It is a practice to provide the tractor with a hand operated valve for controlling the actuation of the trailer brakes so that the operator can apply the trailer brakes independently of the tractor brake; this structure, however really does not solve the problem since it would require extreme dexterity of the operator to actuate both the hand valve and foot valve in some reasonable time sequence in an emergency condition in order to assure trailer braking with or before tractor braking.

In the present invention the trailer pressure control apparatus is mounted to the tractor proximate the rear thereof. The control apparatus includes a fast-acting auxiliary amplifying relay valve having an auxiliary fluid pressure reservoir directly connected to and mounted proximate thereto. As will be seen in one form of the invention the pressure control apparatus takes the place of and hence eliminates the need for the conventional tractor protection valve (the tractor protection valve is operable in response to a substantial drop in air pressure to dump the air in the line to the pressure supply in the trailer; at the same time the emergency relay valve blocks the trailer supply from the line and applies pressure to the trailer brakes).

The fast acting amplifying valve reduces the time for a pressure signal of sufficient magnitude to reach the emergency relay valve at the trailer to actuate the trailer brakes and at the same time the amplifying valve will amplify the signal to more than compensate for the inherent pressure drops in the system.

The result is that the trailer brakes will be actuated faster than with conventional systems and at the same time can be actuated to lead the tractor brakes. The system can be used with multi-trailer applications and in these applications will provide for sequential actuation of the brakes from the rearmost trailer brakes up to the tractor.

Therefore it is an object of the present invention to provide a tractor-trailer braking system including pressure control apparatus for the trailer whereby the trailer brakes will be actuated co-incidentally with or before the tractor brakes.

It is another object of the present invention to provide such a system for use with a series of trailers and in which the brakes of tractor and trailers will be actuated sequentially from the rearmost trailer brakes up to the tractor.

Other objects, features, and advantages of the present invention will become apparent from the subsequent description and the appended claims, taken in conjunction with the accompanying drawings, in which:

FIG. 4 is a schematic diagram of a modified form of the invention for use with a trailer-mounted system; and FIG. 5 is a schematic diagram of a form of the system of the present invention for use with a tractor, a semi-trailer and a true trailer combination.

Figure 1:
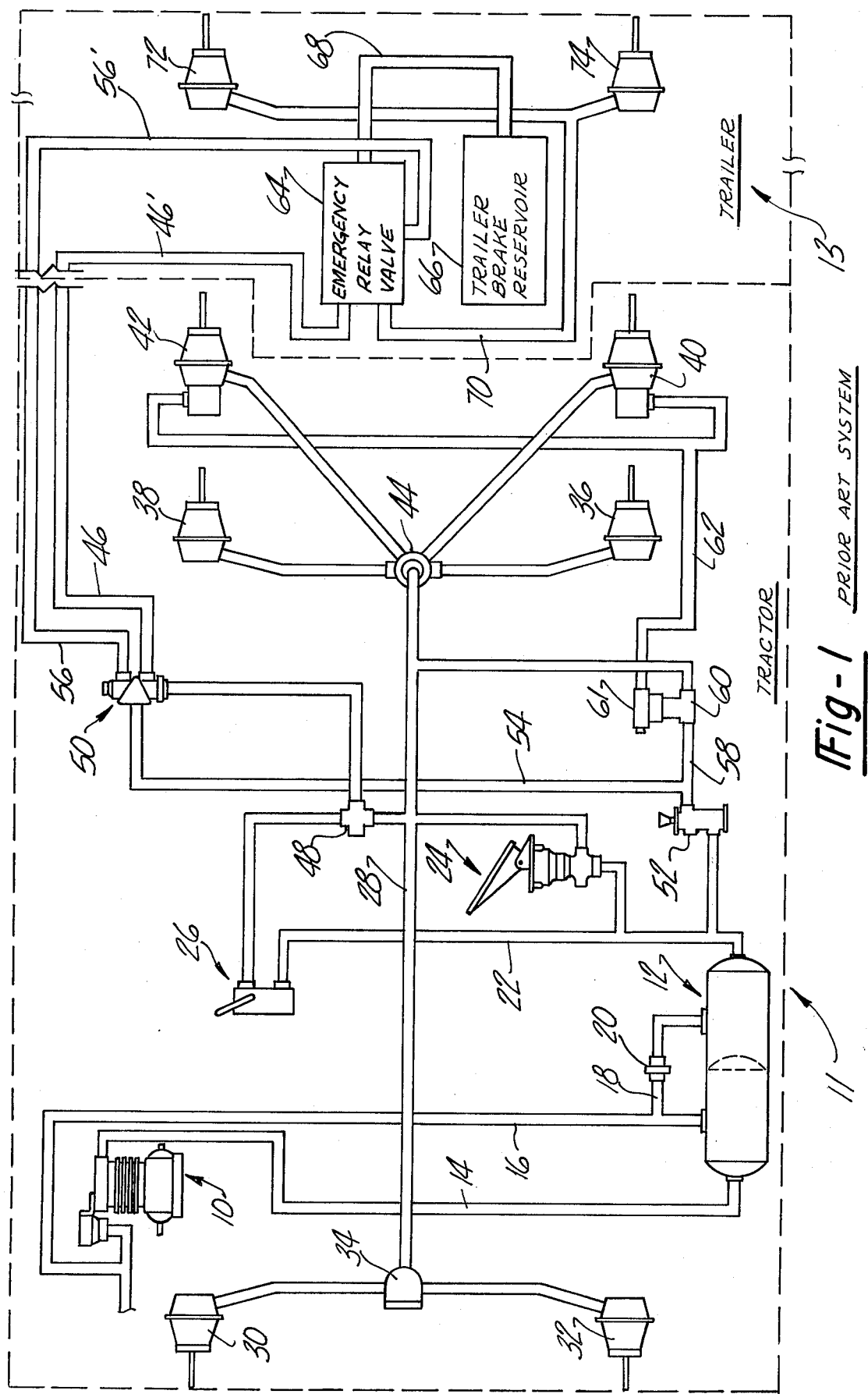
FIG. 1 is a schematic diagram depicting a conventional tractor-trailer brake system.

A schematic diagram of a conventional tractor-trailer brake system is shown in FIG. 1. Thus in FIG. 1 a tractor brake system is shown in the dotted lines indicated by numeral 11 while a connected trailer system is shown in the dotted lines indicated by numeral 13. In that system a compressor 10 provides a source of compressed air to one side of a reservoir 12 via lines 14 and 16. Line 16 is conventionally connected to a governor to maintain pressure at 120 psi. The opposite side of reservoir 12 is connected thereto via fluid line 18 and one way check valve 20. A line 22 connects the opposite side of reservoir 12 to the inlet sides of a foot operated treadle valve 24 and a hand operated control valve 26. Both the treadle valve 24 and control valve 26 are pressure modulating or control valves of a well known type and can be actuated to provide a desired or selected output pressure. The output from treadle valve 24 is connected to a service line fluid circuit which includes a line 28 which is connected to a pair of front brake actuators 30, 32 via a quick release valve 34 and to a first pair of rear brake actuators 36, 38 and second pair of rear brake actuators 40, 42 via a quick release or relay valve 44. Quick release valves 34 and 44 are of well known types to permit quick release of air from the associated brake actuators in the event of release of the threadle valve 24. The actuators 40 and 42 are of a spring set brake type for self actuation in emergency air loss conditions. Line 28 is connected to a trailer service line 46 via a two way check valve 48 and a tractor protection valve 50, which serves a purpose to be described. Note, however, that the service line 46 will have a pressure level dependent upon the pressure transmitted to the tractor brake actuators 30, 32 etc. This pressure level provides a signal for actuation of the trailer brake system 13.

In addition to the service line fluid circuit previously described, the tractor system 11 includes an emergency fluid circuit.

Thus line 22 from reservoir 12 is also connected to an air supply valve or dash valve 52 located in the driver's compartment. The dash valve 52 has its output connected to one output line 54 which is connected to one side of the protection valve 50 and thence to emergency line 56; valve 52 has its output connected to a second output line 58 which is connected to the spring set brake actuators 40, 42 via a two way check valve 60, a quick release valve 61 and output line 62. All of the foregoing components and system portions are conventional components and portions in known systems and since the details thereof do not form a part of the present invention, they have been omitted for purposes of simplicity; likewise the following described system and parts of the trailer brake system 13 are well known and the specific details thereof do not constitute a part of the present invention and hence these details have been omitted for purposes of simplicity.

Thus from the tractor system 11 the service line 46 is connected to service line 46' in the trailer system 13 and emergency line 56 to emergency line 56'. The service line 46' is connected to an inlet of an emergency relay valve 64 and emergency line 56' is connected to another inlet of the relay valve 64. Relay valve 64 is connected to a reservoir 66 via line 68 and has an output line 70 connected to trailer brake actuators 72 and 74.

In conventional operation, when the tractor system 11 and trailer system 13 are first connected together the trailer system 13 has at least partially voided. The operator manually actuates the dash valve 52 to hold it closed while the trailer system 13 becomes fully charged from the tractor system 11. As this occurs the trailer reservoir 66 is charged through the emergency relay valve 64. Note that the dash valve 52, in response to a low pressure on the emergency fluid circuit indicating a malfunction, will block line 22 and vent lines 54 and 58. When this occurs tractor protection valve 50 will also be vented via line 54 and will shift to block service line 46 from line 28 and vent line 56. This results in corresponding trailer line 56' venting causing emergency relay valve 64 to shift to its emergency position blocking line 68 to reservoir 66 from the emergency line 56'. At the same time relay valve 64 in this emergency position directly connects the reservoir 66 to the trailer brake actuators 72, 74 applying the trailer brakes and maintaining them applied.

Note that for normal braking application the emergency relay valve 64 will provide venting of the actuators 72, 74 for quick release when the signal at service line 46' indicates brake release.

The hand control valve 26 provides means for actuating the trailer brake system 13 independently of the foot or treadle valve 24. When hand valve 26 is actuated check valve 48 blocks valve 24 from protection valve 50 and service line 46 and actuation of the trailer brakes is solely through hand control valve 26. Likewise when foot valve 24 is actuated the two way check valve 48 blocks hand valve 26 from the service line 46.

As previously noted the problem with the above system is that the brakes of the trailer system 13 will lag in application to those of the tractor system 11. This occurs for several reasons. First the emergency relay valve 64 acts as a modulating valve and will provide an output pressure from reservoir 66 of a magnitude dependent upon the control pressure or signal at service line 46'. This pressure ideally should equal the pressure in line 28. As a practical matter the various number of valves and restrictions and the length of transmission line result in a significant pressure drop at the relay valve 64. At the same time, since the system is normally in a dynamic state, the various restrictions provide a significant time delay. Note in this regard that in an initial brake application the service lines 46 and 46' are void and must be filled thereby contributing to the time delay. Thus the signal arrives delayed and is attenuated all resulting in a delay in trailer brake application. In the present invention this is remedied by providing a fast acting amplifier valve between the tractor brake system 11 and trailer brake system 13. This valve as will be seen is supplied by its own air supply and will provide an amplified output to the relay valve 64 whereby the brakes of the trailer brake system 13 will be actuated in coincidence with or in advance of the brake of the tractor system 11.

Figure 2:
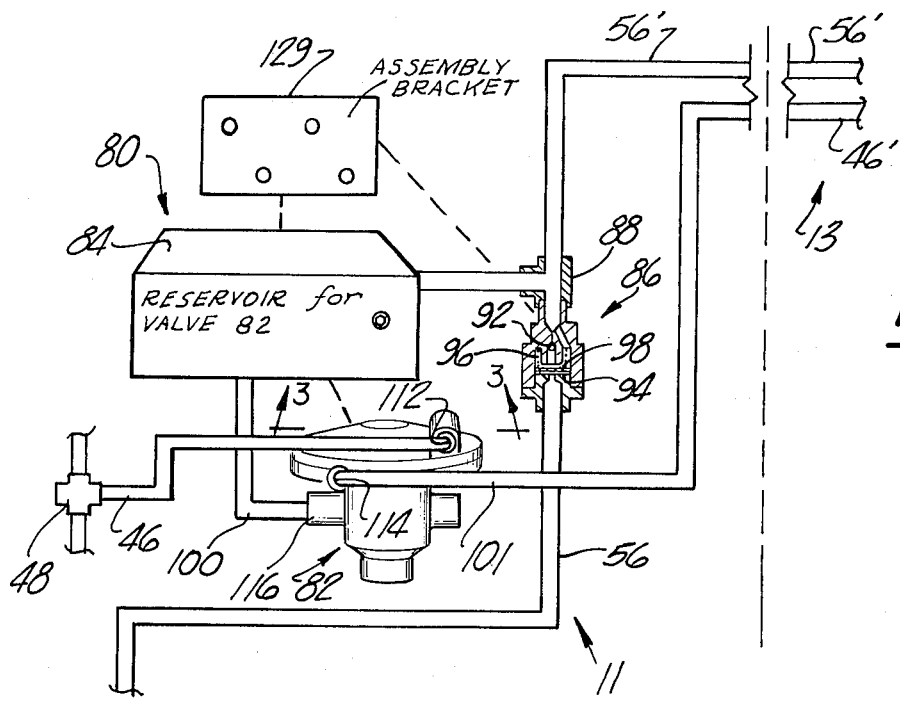
FIG. 2 is a schematic diagram of the system of FIG. 1 modified to depict a preferred form of the system of the present invention including trailer pressure control apparatus.

FIG. 2 depicts a conventional system modified to include a preferred form of the invention. Thus the trailer pressure control apparatus is generally indicated by the numeral 80 and includes a fast acting amplifying valve 82, a reservoir 84 and a dump valve 86. As will be seen, the dump valve 86 permits the elimination of the tractor protection valve 50 providing a reduction in time delay and pressure loss in the system.

The reservoir 84 is preferably of a square or rectangular cross-section in order to maximize the permissible volume for a given projected area. A standard tee coupling 88 is connected at one side to permit flow into reservoir 84. Emergency line 56' is connected to another end of tee 88 and dump valve 86 is connected to the opposite end of tee 88. Dump valve 86 has an inlet connected to tractor emergency line 56. Dump valve 86 normally permits through flow of air from tractor emergency line 56 to trailer emergency line 56' and reservoir 84. The dump valve can be of a construction well known in the art and generally includes a valve body having an exhaust cross port 92 therein. When the tractor emergency line 56 is pressurized a shuttle 94 compresses a spring 96 and seals the exhaust port 92 via seal 98. If the pressure in the emergency line 56 drops below a selected minimum the spring 96 opens the passage to port 92 thereby exhausting the emergency line 56' and the reservoir 84 permitting emergency actuation of the actuators 72, 74 for the trailer brakes and shutting off reservoir 84 supply. The dump valve can be of a known construction and in one form of the invention a 4200 Dump Valve by Sealco Air Controls, Inc., would be satisfactory. While the dump valve 86 in a sense replaces the tractor protection valve 50, it is important to note that the passage through protection valve 50 for the pressure signal from line 28 to service line 46 has been eliminated. Thus this pressure drop and time delay have been eliminated from the pressure signal circuit. Let us look again to FIG. 2 to determine the remainder of the pressure control apparatus 80.

Figure 3:
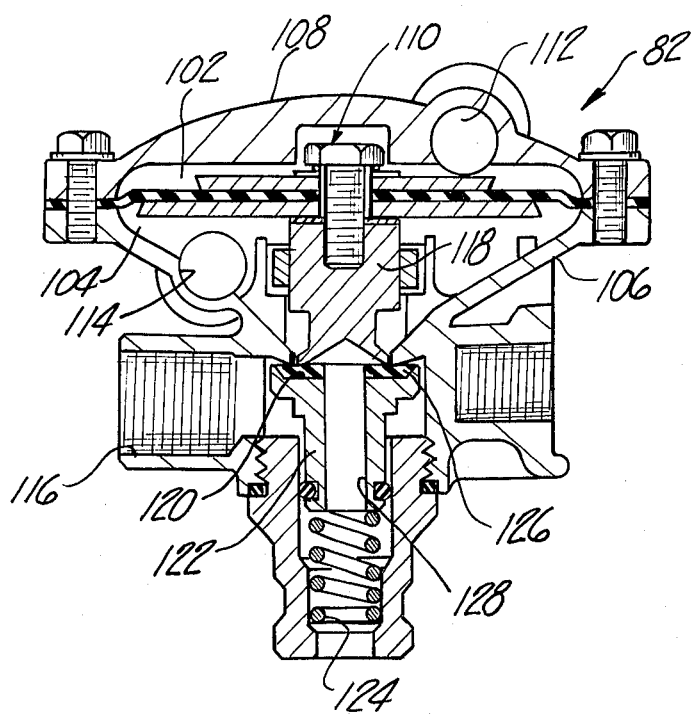
FIG. 3 is a sectional view of the amplifying valve of FIG. 2 taken generally along the lines 3—3.

Thus the amplifier valve 82 is connected to tractor service line 46 to receive the pressure signal therefrom. The valve 82 is connected to the reservoir 84 via a tank nipple or line 100 and has an outlet line 101 connected to trailer service line 46'. In a manner to be seen, the valve 82 will provide an amplified output control pressure at lines 101 and 46' which varies in magnitude in accordance with variations in magnitude of the pressure signal at service line 46. The amplified signal at trailer service line 46' will now be transmitted to the emergency relay valve 64 whereby a higher output will result. Let us look now to FIG. 3 where the details of a preferred form of amplifying valve 82 are shown. The valve 82 can be of conventional, known construction modified in a manner to be described. In FIG. 3, valve 82 has a control chamber 102 and an output chamber 104. The chambers 102 and 104 are defined by a hollow valve housing 106 and a cap 108 with a diaphragm valve assembly 110 sandwiched therebetween; a port 112 in cap 108 is connected to tractor service line 46 to communicate the pressure signal to control chamber 102. A port 114 is connected to tractor service line 46' whereby a control output signal in chamber 104 is communicated to emergency relay valve 64. An inlet 116 is connected to line 100 and thence to the reservoir 84.

The diaphragm assembly 110 has a valve actuator 118 connected for movement therewith and has its lower end engageable with a double seal 120 carried on the upper end of a movable seat member 122. A spring 124 normally biases the seal 120 into sealing engagement with a valve seat 126 whereby inlet 116 and hence reservoir 84 are blocked from communication with control chamber 104. Upon the occurrence of a pressure signal in control chamber 102 diaphragm assembly 110 will move actuator 118 downwardly against seal 120 to move that seal away from seat 126 to permit air from reservoir 82 into pressure chamber 102 until the pressure therein balance that in chamber 102 closing seal 120 against seat 126. Because of the ratios involved the pressure in chamber 104 will be greater than that in chamber 102 and hence the emergency relay valve 64 will be actuated by an amplified control signal. Upon release of the pressure signal from service line 46 and control chamber 102 the pressure in line 46' and chamber 102 will move diaphragm assembly 110 upwardly to move actuator 118 away from dual seal 120 thereby communicating the control pressure signal in chamber 104 to atmosphere via a port 128 in actuator 122. This structure permits for rapid dumping of the amplified control pressure and rapid release of the brake pressure from trailer brake actuators 72, 74. Note that the control apparatus 80 in the form previously shown is adapted to be mounted on a common assembly bracket 129 whereby the apparatus 80 (including valve 82, reservoir 84, valve 90, tee 88 and valve 86) are mounted at the rear of the tractor. With the conventional construction the pressure signal at service line 46 and hence pressure was relieved by dumping the pressure either at the treadle valve 24 or hand control valve 26 both located in the cab of the tractor. Thus a substantial time lag for the pressure drop occurred. Hence in the conventional system the trailer actuators 72, 74 lagged the tractor actuators 30, 32, etc, both in pressure application and release. Both conditions degrade the total effective braking of the tractor-trailer combination and both lag conditions are minimized with the present invention.

It is important that the amplifying valve 82 have an independent air supply immediately adjacent to provide the pressure control signal to the emergency relay valve 64. In the conventional system upon initiation of brake application a pressure drop occurs in reservoir 12 as the service lines are filled and the chambers in the tractor brake actuators are filled. This initial reduction could be seen by the emergency relay valve 64. In the present invention, this drop is not seen directly since the control pressure is provided by the independent air supply in reservoir 84. This enhances the output characteristics since now a more uniform, higher pressure will be used to provide the pressure control signal to the relay valve 64.

It has been found that the reservoir 82 should have at least a minimum volume and pressure to assure adequate capacity to provide the necessary air for cavity fill without significant pressure loss. Thus the volume should exceed 50 cubic inches and ideally would be 85 cubic inches. For optimum results, reservoir pressure should be set at 120 psi, through adjustment of governor on the compressor.

In order to speed the actuation of amplifying valve 82, the conventional valve has been modified to reduce the volume of the control chamber 102. Thus control chamber 102 should have a volume less than 10 cubic inches; acceptable operation can be attained with 5 cubic inches and in a preferred form excellent results were attained with a volume of 2.25 cubic inches.

The amplifying valve 82 must be quick acting and as constructed will be at incipient actuation at 1 to 1.25 psi pressure in control chamber 102 in 8 milliseconds and will provide a 3 psi output from pressure chamber 104 in 12 – 15 milliseconds. For advantageous results the latter delay should be no greater than around 20 milliseconds. The above times were noted with an input pressure of 120 psi. In addition amplification of 1.3:1 has been found satisfactory. With the above system, in a full braking application at foot or treadle valve 24 the trailer foundation brakes will actuate just lightly ahead of the tractor brakes. Pressure buildup from 0 to 60 psi in the trailer service chambers 72 and 74 will occur in as little as 0.260 seconds depending on chamber size, volumetric fill of trailer relay valves, slack adjuster settings and type of brake. Normal improvement in existing systems will provide a reduction in time in a range from 0.200 seconds to 0.450 seconds for semi-trailer applications and as much as 1.250 seconds for rearmost axles on true trailers in multi-axle doubles or "Michigan trains." Normal tractor tandem brake pressure 0 – 60 psi will occur in 0.290 to 0.350 seconds. Thus with the system of the present invention full braking pressure at the trailer can be secured prior to full braking at the tractor. Note that with the fast application and release of its trailer brakes the vehicle operator now has a better feel for the braking of the total combination and can more effectively 'pump' the brake pedal to avoid lock up. In the event of lock up, however, the trailer brakes will lock up ahead of or coincidentally with the tractor brakes thus minimizing the possibility of jack-knifing. Note that that since the trailer brakes can be assured of being actuated prior to the tractor brake the hand control valve 26 and two way check valve 48 can be eliminated in some systems.

An alternate embodiment of the system of the present invention is shown in FIG. 4. In this embodiment, the pressure control apparatus 80a is mounted on semi-trailer associated with trailer system 13 and is proximate the forward end thereof. The connections are as shown and previously described. Note, however, that in the system with apparatus 80a, the tractor protection valve 50 must be left in the system and hence the dump valve 86 is eliminated. Since the apparatus 80a is located on the trailer, lines 56a and 46a are trailer system lines connecting tractor lines 56 and 46, respectively, to the valve 82.

FIG. 5 shows a schematic of an embodiment for a tractor, semi-trailer, and true trailer combination. In that combination the tractor system 11 and trailer system 13 are identical to that shown and described in FIG. 2 and are shown in combination with a true trailer brake system 178. However, in that combination a second pressure control assembly 180 similar to assembly 80 is mounted on the rear of the semi-trailer associated with trailer system 13. In that case the true trailer brake system 178 has its emergency relay valve 164 connected to assembly 180 to receive the amplified output therefrom. Note that the input pressure signal to pressure control assembly 180 is the amplified control pressure signal at emergency relay valve 64 from the amplifying valve 82. Note that assembly 180 could not normally include a dump valve similar to dump valve 86. Note that with the amplified signal at emergency relay valve 64 being further amplified and transmitted to emergency relay valve 164 the brakes for the true trailer system 178 will be actuated in coincidence with or before the actuation of the trailer brake system 13. Thus in a lock up condition the true trailer brakes can lock up first, the semi-trailer brakes next and finally the tractor brakes; this system then can effectively minimize the possibility of over-running or jackknifing.

In the embodiment of FIG. 5, components in true trailer system 178 similar to like components in trailer system 13 have been given the same numeral designation with the addition of 100 i.e. relay valve 164 corresponds to relay valve 64.

Thus the system of the present invention as shown and described provides for substantial improvement in braking of tractor-trailers or tractor, semi-trailer, true trailer combinations.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a brake system for a tractor-trailer combination with the system including a tractor brake system and a trailer brake system; the tractor brake system including a supply of air under pressure including a tractor reservoir, pneumatically actuated tractor brake actuators actuable by air pressure from the supply of air for actuating the tractor brakes, a modulating valve connected between the supply of air and the tractor brake actuators for modulating the magnitude of air pressure to the tractor brake actuators, a service fluid line connecting the output of the modulating valve to the tractor brake actuators, a tractor emergency line connected to the supply of air; the trailer brake system including a trailer reservoir for storing air under pressure, pneumatically actuated trailer brakes actuable by air pressure from the trailer reservoir, an emergency relay valve connected to the trailer reservoir and connected to the trailer brake actuators, the emergency relay valve being actuable to a pair of operating conditions, a trailer emergency line connected to the tractor emergency line and to the emergency relay valve for charging the trailer reservoir with air pressure from the tractor air supply when the emergency relay valve is in one of the conditions, a trailer service line connected to the emergency relay valve for transmitting a pressure signal to the emergency relay valve whereby the emergency relay valve in a different one of the conditions will transmit fluid pressure from the trailer reservoir to the trailer brake actuators with the transmitted pressure varying in accordance with the magnitude of the pressure in the tractor service line, the improvement comprising: fast acting amplifying relay valve means for providing an output pressure greater than an input pressure by a preselected ratio, an auxiliary reservoir separate from the tractor reservoir and trailer reservoir, first conduit means connecting the tractor service line to said relay valve means for providing said input pressure thereto as a function of the magnitude of the pressure at the tractor brake actuators, second conduit means for connecting said auxiliary reservoir to said relay valve means to provide said output pressure, third conduit means for connecting said output pressure to the trailer service line whereby said output pressure will provide the pressure signal to the emergency relay valve and dump valve means for venting the air pressure from the trailer emergency line when the pressure therein drops to a preselected minimum, fifth conduit means connecting said dump valve means in between the tractor emergency line and trailer emergency line and sixth conduit means connecting said auxiliary reservoir to said dump valve means for venting the air pressure from said auxiliary reservoir when the pressure in the trailer emergency line drops to said preselected minimum.

2. The system of claim 1 further comprising fourth conduit means for connecting the trailer emergency line to an input of said auxiliary reservoir for charging said auxiliary reservoir from the tractor air supply.

3. The system of claim 2 with said amplifying relay valve means including a port for venting the fluid from the trailer service line in the absence of said input pressure.

4. The system of claim 2 with said fast acting relay valve means and said auxiliary reservoir mounted on the trailer.

5. The system of claim 1 with said amplifying relay valve means including a port for venting the fluid from the trailer service line in the absence of said input pressure.

6. The system of claim 5 with said amplifying relay means and said auxiliary reservoir being located proximate the rear of the tractor.

7. The system of claim 1 with said amplifying valve means, said auxiliary tank and said dump valve means located on the tractor proximate the rear thereof.

8. The system of claim 1 in which said preselected ratio is set to assure actuation of the trailer brakes prior to actuation of the tractor brakes.

9. The system of claim 1 with the volume of said auxiliary reservoir being greater than around 50 cubic inches.

10. The system of claim 1 with the volume of said auxiliary reservoir being around 85 cubic inches.

11. The system of claim 1 with said amplifying relay valve means having a control chamber for receiving said input pressure, said control chamber having a volume less than 10 cubic inches.

12. The system of claim 11 with said control chamber having a volume less than around 5 cubic inches.

13. The system of claim 11 with said control chamber having a volume of around 2.25 cubic inches.

14. The system of claim 1 with said amplifying valve means being in incipient actuation with said input pressure at 1 to 1.25 psi in around 8 milliseconds.

15. The system of claim 1 with said amplifying valve means providing an output pressure of around 3 psi in less than around 20 milliseconds.

16. The system of claim 1 with said amplifying valve means providing an output pressure of around 3 psi in less than around 15 milliseconds.

17. The system of claim 1 with said preselected ratio being at least around 1.3 to 1.

18. In a brake system for a tractor-trailer combination with the system including a tractor brake system and a trailer brake system; the tractor brake system including a supply of air under pressure including a tractor reservoir, pneumatically actuated tractor brake actuators actuable by air pressure from the supply of air for actuating the tractor brakes, a modulating valve connected between the supply of air and the tractor brake actuators for modulating the magnitude of air pressure to the tractor brake actuators, a service fluid line connecting the output of the modulating valve to the tractor brake actuators, a tractor emergency line connected to the supply of air; the trailer brake system including a trailer reservoir for storing air under pressure, pneumatically actuated trailer brakes actuable by air pressure from the trailer reservoir, an emergency relay valve connected to the trailer reservoir and connected to the trailer brake actuators, the emergency relay valve being actuable to a pair of operating conditions, a trailer emergency line connected to the tractor emergency line and to the emergency relay valve for charging the trailer reservoir with air pressure from the tractor air supply when the emergency relay valve is in one of the conditions, a trailer service line connected to the emergency relay valve for transmitting a pressure signal to the emergency relay valve whereby the emergency relay valve in a different one of the conditions will transmit fluid pressure from the trailer reservoir to the trailer brake actuators with the transmitted pressure varying in accordance with the magnitude of the pressure in the tractor service line, the improvement comprising: fast acting amplifying relay valve means for providing an output pressure greater than an input pressure by a preselected ratio, an auxiliary reservoir separate from the tractor reservoir and trailer reservoir, first conduit means connecting the tractor service line to said relay valve means for providing said input pressure thereto as a function of the magnitude of the pressure at the tractor brake actuators, second conduit means for connecting said auxiliary reservoir to said relay valve means to provide said output pressure, third conduit means for connecting said output pressure to the trailer service line whereby said output pressure will provide the pressure signal to the emergency relay valve fourth conduit means for connecting the trailer emergency line to an input of said auxiliary reservoir for charging said auxiliary reservoir from the tractor air supply, a second trailer having a second trailer brake system similar to that described for the first trailer brake system said system further comprising: a second fast acting amplifying relay valve means similar to the first said valve means, a second auxiliary reservoir, sixth conduit means for connecting said amplified output pressure of the first said valve means to provide a second input pressure to said second valve means and seventh conduit means for connecting the amplified output pressure from said second valve means to provide the pressure signal for the second emergency relay valve, light conduit means connecting said second reservoir to said second relay valve to provide the source for the amplified output pressure.

19. In a brake system for a tractor-trailer combination with the system including a tractor brake system and a trailer brake system, the tractor brake system including a supply of air under pressure including a tractor reservoir, pneumatically actuated brake actuators actuable by air pressure from the supply of air for actuating the tractor brakes, a modulating valve connected between the supply of air and the tractor brake actuators for modulating the magnitude of air pressure to the tractor brake actuators, a service fluid line connecting the output of the modulating valve to the tractor brake actuators, the trailer brake system including a trailer reservoir, a trailer relay valve connected to the trailer reservoir and connected to pneumatically actuated brake actuators, a trailer service line connected to the trailer relay valve for transmitting a pressure signal to the trailer relay valve whereby that valve will transmit fluid pressure from the trailer reservoir to the trailer brake actuators with the transmitted pressure varying in accordance with the magnitude of the pressure in the tractor service line, said trailer brake system comprising; fast acting amplifying relay valve means for providing an output pressure greater than an input pressure by a preselected ratio, an auxiliary reservoir separate from the tractor reservoir and trailer reservoir, first conduit means connected to said relay valve means for providing said input pressure thereto as a function of the magnitude of the fluid pressure at the tractor brake actuators, second conduit means for connecting said auxiliary reservoir to provide said output pressure, third conduit means for connecting said output pressure to the trailer service line whereby said output pressure will provide the pressure signal to the trailer relay valve the trailer brake system including a trailr emergency line connected to the supply of air and further comprising fourth conduit means for connecting the trailer emergency line to an input of said auxiliary reservoir for charging said auxiliary reservoir and dump valve means for venting the air pressure from the trailer emergency line and said auxiliary reservoir when the pressure therein drops to a preselected minimum.

20. The system of claim 19 with said amplifying relay valve means including a port for venting the fluid from the trailer service line in the absence of said input pressure.

21. The system of claim 20 with said amplifying relay means being located proximate the rear of the tractor.

22. The system of claim 19 in which said preselected ratio is set to assure actuation of the trailer brakes prior to actuation of the tractor brakes.

23. The system of claim 22 with said amplifying relay valve means including a port for venting the fluid from the trailer service line in the absence of said input pressure.

24. The system of claim 23 with said fast acting relay valve means and said auxiliary reservoir mounted on the trailer.

25. The system of claim 19 with the volume of said auxiliary reservoir being greater than around 50 cubic inches.

26. The system of claim 19 with the volume of said auxiliary reservoir being around 85 cubic inches.

27. The system of claim 19 with said amplifying relay valve means having control chamber for receiving said input pressure, said control chamber having a volume less than 10 cubic inches.

28. The system of claim 27 with said control chamber having a volume less than around 5 cubic inches.

29. The system of claim 27 with said control chamber having a volume of around 2.25 cubic inches.

30. The system of claim 19 with said amplifying valve means being in incipient actuation with said input pressure at 1 to 1.25 psi in around 8 milliseconds.

31. The system of claim 19 with said amplifying valve means providing an output pressure of around 3 psi in less than around 20 milliseconds.

32. The system of claim 19 with said amplifying valve means providing an output pressure of around 3 psi in less than around 15 milliseconds.

33. The system of claim 19 with said preselected ratio being at least around 1.3 to 1.

* * * * *